United States Patent
Zörnack et al.

(10) Patent No.: US 8,459,697 B2
(45) Date of Patent: Jun. 11, 2013

(54) ARRANGEMENT FOR SECURING OF A STEERING COLUMN OF A MOTOR VEHICLE

(75) Inventors: Markus Zörnack, Dortmund (DE); Mark Hirt, Bochum (DE); Peter Seyfried, Dortmund (DE); Christian Dornscheidt, Düsseldorf (DE); Matthias Hein, Gelsenkirchen (DE); Martin Hinz, Issum (DE); Paul Angenheister, Kempen (DE); Thomas Beer, Grefrath (DE); Alfred Mai, Hückeswagen (DE); Klaus Kierspel, Rösrath (DE); Norberto Silva, Essen (DE); Jochen Zimmermann, Wuppertal (DE); Viktor Arbanas, Baden (CH); Michael Maag, Kreuzlingen (CH); Carsten Manneck, Feldkirch (AT); Max Oertle, Mauren (LI)

(73) Assignees: ThyssenKrupp Presta AG, Eschen (LI); Johnson Controls GmbH, Industriestr., Burscheid (DE)

( * ) Notice: Subject to any disclaimer, the term of this patent is extended or adjusted under 35 U.S.C. 154(b) by 542 days.

(21) Appl. No.: 12/373,650

(22) PCT Filed: Jul. 17, 2007

(86) PCT No.: PCT/EP2007/057383
§ 371 (c)(1),
(2), (4) Date: Feb. 8, 2010

(87) PCT Pub. No.: WO2008/009683
PCT Pub. Date: Jan. 24, 2008

(65) Prior Publication Data
US 2010/0140912 A1    Jun. 10, 2010

(30) Foreign Application Priority Data
Jul. 18, 2006   (DE) .......................... 10 2006 033 606

(51) Int. Cl.
*B62D 1/16*   (2006.01)

(52) U.S. Cl.
USPC ........................................ 280/779; 403/408.1

(58) Field of Classification Search
USPC ............ 280/779; 411/337, 366.1; 403/408.1; 248/200, 230.8
See application file for complete search history.

(56) References Cited

U.S. PATENT DOCUMENTS 3,373,965 A * 3/1968 Bien et al. ................... 248/205.1
3,868,864 A * 3/1975 Durkee et al. ................... 74/492

(Continued)

FOREIGN PATENT DOCUMENTS

DE   10200890   7/2003
DE   20219491   4/2004

(Continued)

OTHER PUBLICATIONS

International Search Report for International Application No. PCT/EP2007/057383.

*Primary Examiner* — Drew Brown
*Assistant Examiner* — George Spisich
(74) *Attorney, Agent, or Firm* — Reinhart Boerner Van Deuren P.C.

(57) ABSTRACT

An arrangement for securing a steering column to a cross member, in particular to a cockpit carrying member, of a motor vehicle, includes a steering column with retaining means. This arrangement makes it possible on the one hand with simple means to secure the steering column to the cross member of the motor vehicle and, on the other hand, with a further reduction in costs and weight, to enable a high degree of flexibility in relation to the use of the cross member and the steering column for different motor vehicles, by including a cross member that has, for securing the steering column, at least one hole running transverse to the longitudinal direction of the cross member for at least one securing means, and retaining means of the steering column wherein the retaining means are secured by at least one securing means to the cross member.

17 Claims, 2 Drawing Sheets

U.S. PATENT DOCUMENTS

| | | | |
|---|---|---|---|
| 4,452,096 A * | 6/1984 | Workman | 74/492 |
| 4,738,469 A * | 4/1988 | Ushijima et al. | 280/777 |
| 4,895,391 A * | 1/1990 | Groat | 280/779 |
| 4,934,861 A * | 6/1990 | Weeks et al. | 403/408.1 |
| 5,114,182 A * | 5/1992 | Thull et al. | 280/779 |
| 5,181,435 A * | 1/1993 | Khalifa et al. | 74/492 |
| 5,605,073 A * | 2/1997 | Milton et al. | 74/492 |
| 5,651,649 A * | 7/1997 | Sadri et al. | 411/34 |
| 5,868,426 A * | 2/1999 | Edwards et al. | 280/779 |
| 5,980,174 A * | 11/1999 | Gallagher et al. | 411/55 |
| 6,398,259 B1 * | 6/2002 | Palmer et al. | 280/777 |
| 6,497,432 B2 * | 12/2002 | Scheib et al. | 280/779 |
| 7,086,665 B2 * | 8/2006 | Lee | 280/779 |
| 2002/0056982 A1 * | 5/2002 | Brownlee et al. | 280/779 |
| 2004/0145170 A1 * | 7/2004 | Fischer et al. | 280/779 |

FOREIGN PATENT DOCUMENTS

| | | |
|---|---|---|
| DE | 10253959 | 6/2004 |
| DE | 103 52 224 | 6/2005 |
| EP | 1203711 | 5/2002 |
| EP | 1234744 | 8/2002 |

* cited by examiner

ARRANGEMENT FOR SECURING OF A STEERING COLUMN OF A MOTOR VEHICLE

CROSS-REFERENCE TO RELATED APPLICATIONS

This application is a National Phase Application of International Application No. PCT/EP2007/057383, filed on Jul. 17, 2007, which claims the benefit of and priority to German patent application no. DE 10 2006 033 606.2-21, filed Jul. 18, 2006. The disclosures of the above applications are incorporated herein by reference in their entirety.

FIELD OF THE INVENTION

The invention relates to an arrangement for securing a steering column to a cross member, in particular to a cockpit carrying member, of a motor vehicle, wherein the steering column has retaining means. In addition to this, the invention relates to an advantageous use of the arrangement according to the invention for securing a steering column.

BACKGROUND

The steering column of a motor vehicle is usually arranged beneath a cross member of the motor vehicle, and secured to it. To secure the steering column to this cross member, which can also be designed as a cockpit carrying member, retaining devices are usually provided, which are frequently connected to the cross member by an adhesive bond, for example by a welding connection. For example, from the German Patent Specification DE 102 53 959 B4 an arrangement is known for securing a steering column to a cross member of a motor vehicle, in which an additional carrier element is welded onto the cross member, which accommodates the retaining means of the steering column. From the published European Patent Application EP 1 234 744 A2, moreover, a steering column retaining arrangement is known, which consists of a retaining clamp welded onto the cross member, to which the steering column is secured by means of a steering column holder arranged beneath the steering column.

A problem with the known arrangements for securing a steering column to a cross member is that these additional complex carrier elements have retaining clamps which are welded securely to the cross member in order to secure the steering column to this. From this there results not only additional manufacturing steps in the manufacture of the cross member, but also the flexibility is restricted with regard to the use of the cross member to one individual vehicle type with a specific steering column arrangement. Moreover, the material requirement for the known arrangements for securing a steering column to the cross member of a motor vehicle is relatively high, which is reflected in increased costs.

SUMMARY OF THE INVENTION

Taking this as a basis, the present invention is based on providing an arrangement for securing a steering column to a cross member, in particular to a cockpit carrying member, of a motor vehicle, which on the one hand makes it possible with simple means to secure the steering column to the cross member of the motor vehicle and, on the other hand, with a further reduction of costs and weight, permits a high degree of flexibility in relation to the use of the cross member and the steering column for different motor vehicles.

According to a first aspect of the present invention, by an arrangement for securing a steering column to a cross member, in particular to a cockpit carrying member, includes a cross member having, for securing the steering column, at least one hole running transverse to the longitudinal direction of the cross member for at least one securing means, and retaining means of the steering column being secured by at least one securing means to the cross member.

In contrast to the previously known solutions for securing the steering column to a cross member of a motor vehicle, according to the invention the steering column is connected, by means of its retaining means, directly to the cross member by securing means. As securing means, preferably bolts and/or rivets are provided. Additional carrier elements or retaining elements, which must be welded onto the cross member, are not required according to the invention, so that the costs and the weight for securing the steering column to the cross member of a motor vehicle are perceptibly reduced. For example, with a single hole or an opening in the cross member, respectively, by the use of a single bolt to secure the retaining means of the steering column to the cross member, a particularly simple solution can be achieved for connecting the steering column to the cross member. However, the use of two or more holes in the cross member can also be expedient, in order to make use of a plurality of bolts and/or rivets for connecting the steering column to the cross member. Due to the fact that, on the cross member it is only necessary to provide holes or openings running transverse to the longitudinal direction of the cross member for the securing means, the cross member can be used for a large number of motor vehicles, wherein the holes or openings, respectively, can be positioned to correspond to the arrangement of the steering column for each individual vehicle type. As further securing means, use can be made of rivets, for example blind rivets, which relatively easily and rapidly permit connection of the steering column to a cross member. Moreover, due to simple securing of the steering column according to the invention, it is conceivable for the retaining means of the steering column to be designed in such a way that they allow for a plurality of securing positions at the holes of the cross member, dependent on the vehicle type. It is clear that the flexibility is clearly increased with the use of the cross member and/or the steering column for different vehicle types and that accordingly the costs for securing the steering column to the cross member of a motor vehicle can be reduced further. In addition to this, the costs for the manufacture of a motor vehicle can be reduced if the cross member is designed as a cockpit carrying member and therefore simultaneously serves as a mounting for the cockpit.

If, according to an embodiment, the cross member has at least one clearance hole and a sleeve is provided for at least one securing means, which sleeve is pushed through the clearance hole from the face side, the assembly of the steering column can be made easier and the costs for the manufacture of the cross member can be reduced. Preferably, the sleeve is welded onto one side or both sides of the cross member.

If the cross member has at least one clearance hole, a through-bolt can be used as the securing means. For example, the cross member can, however, also simply be prepared for use in several vehicle types with a plurality of clearance holes. The use of a plurality of through-bolts, in particular two through-bolts, further improves the connection of the steering column with regard to its stability, its natural frequency and natural resonance.

According to a further embodiment of the arrangement according to the invention for securing a steering column to a cross member of a motor vehicle, the cross member and/or the retaining means comprise at least partially of metal, in particular steel or a steel alloy, in order to have the necessary strength values. Preferably, the cross member and/or the retaining means are formed by open or closed profiles made of metal.

A particularly simple securing of the steering column to the cross member of a motor vehicle is achieved due to the fact that the retaining means have at least one flange, preferably two flanges, with at least one hole for at least one securing means, in particular a bolt and/or a rivet. If two flanges are used, it is possible, for example, for a through-bolt to be bolted with the cross member both at the first and at the second flange, such that a particularly good connection is achieved between the retaining means of the steering column and the cross member. Naturally, it is also possible to secure the flange or the flanges, respectively, to the cross member by means of bolts or rivets which do not run through the entire cross member. In addition to this, both with the use of one flange and with two or more flanges, a plurality of bolts, through-bolts, and/or rivets can be used.

If for the at least one bolt a sleeve, in particular a bolt sleeve, is provided, which preferably is designed as continuous, then mounting of the steering column to the cross member can be simplified, since this allows, on the one hand, the simple guiding of a through-bolt, for example, through the cross member to connect the steering column. In addition, the torsional rigidity of the connection between the cross member and the steering column can be improved.

A further embodiment of the invention makes provision for sleeves or bolt sleeves to be used which have an internal thread. For example, in this way two relatively short bolts can be used with the sleeve, or one short bolt with a long bolt sleeve, such that installation can be well adapted to the space available in the motor vehicle.

The bolt connection can be secured by spot-welding or projection welding, if at least one weld nut is provided to secure the bolts. The weld nut can, for this purpose, be tacked directly to the retaining means of the steering column. If required, a final welding of the retaining means can lead to a further increase in the rigidity of the connection between steering column and cross member.

A further embodiment of the arrangement according to the invention features nuts being provided on the inside of the cross member which are adhesively bonded and/or in positive or force fit with the cross member, such as weld nuts, so that only short bolts are needed for the securing process.

If reinforcements are provided in the area of the holes or openings on the cross member, higher tightening torques can be used when securing the bolts without leading to damage in the area of the holes or openings on the cross member. In addition to this, the reinforcements in the area of the holes perceptibly improve the strength of the cross member. The reinforcements can be realized in the form of reinforcement elements located on the inside or the outside, wherein the reinforcement elements are, for example, secured to the sheet by an adhesive bond, and/or a positive or force fit before the sheet is formed to produce a hollow profile forming the cross member, and are formed together with the sheet.

A further embodiment of the arrangement according to the invention makes a provision for continuous bolt sleeves to be provided in the area of the holes or openings, respectively, on the cross member as reinforcement at force accommodation points. To achieve this, the bolt sleeves are connected securely to the cross member, for example welded, soldered, or pressed in, and thereby form reinforced force accommodation points on the cross member.

According to a second aspect of the present invention, the arrangement according to the invention for securing a steering column to a cross member of a motor vehicle (described above) can be used in a modular cockpit structure.

A modular cockpit structure is already characterized by its modular design, which enables the cockpit to be adapted by using different components matched to one another. Through the multiple use of individual cockpit modules for different motor vehicles, such as, for example, the cross member or cockpit carrying member, a reduction in manufacturing costs for the cockpit structure is already achieved. The arrangement according to the invention for securing the steering column to a cross member of a motor vehicle is already particularly well prepared for modular use, because by means of this the steering column is secured directly to the cross member by particularly simple securing means, namely by bolts, rivets, and/or through-bolts. Accordingly, the arrangement according to the invention for securing a steering column to a cross member or a cockpit carrying member of a motor vehicle, as already described above, requires no additional carrier elements or retaining elements secured to the cross member. Consequently, this arrangement makes it possible for the cross member and the steering column to be used directly for different vehicle types, such that maximum flexibility and low costs for the cockpit structure are guaranteed.

BRIEF DESCRIPTION OF THE DRAWINGS

There are now a large number of possible embodiments of the arrangement according to the invention for securing a steering column to a cross member, in particular a cockpit carrying member, and its use according to the invention. In this respect, reference is made to the description of an embodiment of an arrangement according to the invention for securing a steering column to a cross member of a motor vehicle, in conjunction with the drawings. The drawings show in FIG. 1: An embodiment of an arrangement according to the invention for securing the steering column to a cockpit carrying member of a motor vehicle in a perspective view.

DESCRIPTION

Figure 1:
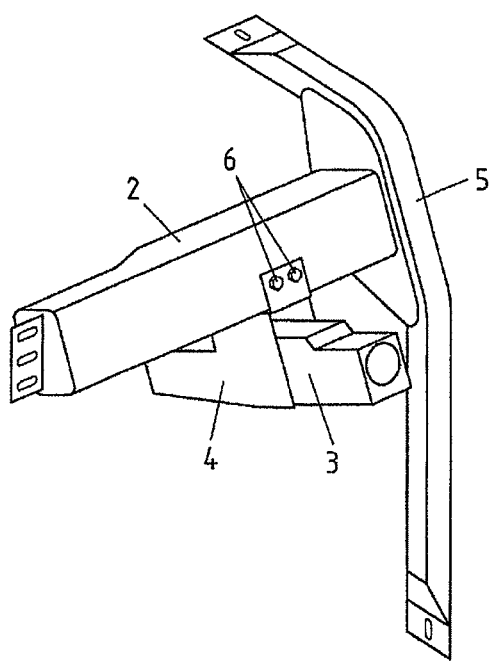

In FIG. 1, initially in a perspective view, a modular designed cockpit structure 1 is represented, which consists of a cross member 2 with two integrated continuous sleeves 8, a steering column 3, its retaining means 4, and a support element 5. The steering column 3 is secured to the cross member 2 by means of the retaining means 4 by way of two through-bolts 6 running through the sleeves 8. The securing of the steering column 3 is effected in this situation by means of a flange 7 of the retaining means 4. The cross member 2 also serves simultaneously in the present embodiment as an accommodation for the cockpit and to this extent represents a cockpit carrying member.

Figure 2:
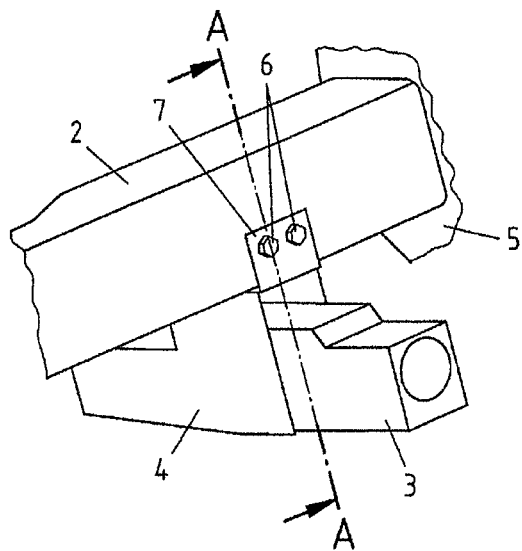
FIG. 2: A section from the drawing in FIG. 1 in an enlarged representation

As can be seen in the enlarged section from FIG. 1, which is represented in FIG. 2, the retaining means 4 of the steering column 3 are formed by a component consisting preferably of metal, in particular steel or a steel alloy. The securing of the retaining means 4 of the steering column 3 to the cross member 2 is effected by means of two flanges 7 surrounding the cross member 2.

Figure 3:
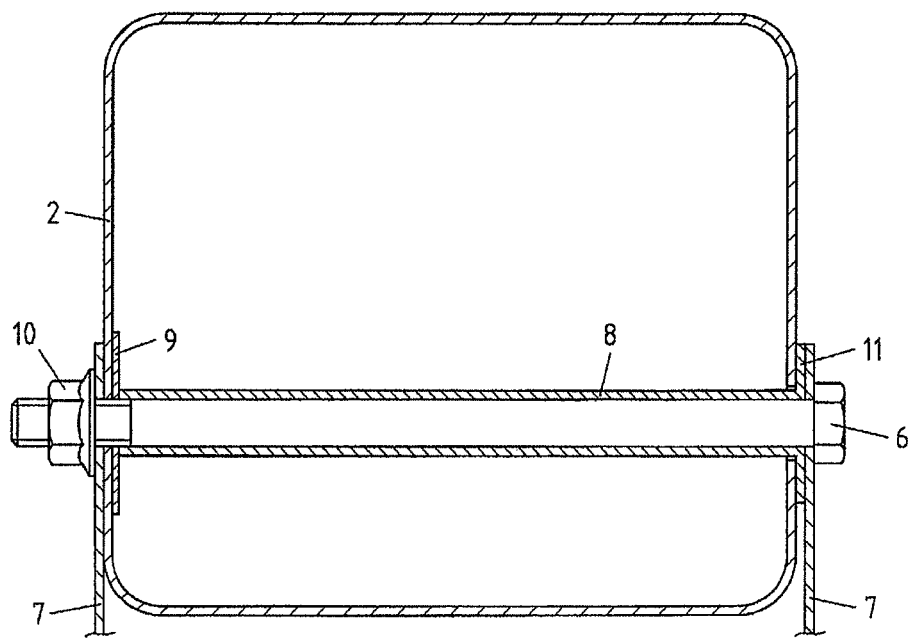
FIG. 3: A sectional view transverse to the axial direction of the cross member along the sectional line A-A of the embodiment from FIG. 1 in the area of a through-bolt.

A sectional view represented in FIG. 3 along a section transverse to the axial direction of the cross member 2 in the area of a through-bolt 6 along the sectional line A-A shows the opposing flanges 7 of the retaining means 4 of the steering column 3 and one of the sleeves 8 running through the cross member 2. The sleeves 8 in the embodiment are inserted through the clearance hole from the face side and abut both with the collar of the sleeve 11 on the face side and on the opposite side abut on the inner side of the cross member 2 and on the reinforcement 9, respectively.

The sleeves 8 are joined to these contact points, particularly by projection welding. The direct connection, without further retaining elements and carrier elements of the retaining means 4 of the steering column 3 to the cross member 2 by the flanges 7 and the through-bolt 6 in combination with the sleeve 8, make possible a very torsionally-rigid connection of the steering column 3 to the cross member 2, since these take over the function of a guide to insert the through-bolt 6 through the cross member 2.

In an advantageous further embodiment of the invention, the sleeve 8 is welded securely on at least one side of the cross member 2. In addition to projection welding, laser welding, friction welding and also other welding methods are also suitable.

To reinforce the wall of the cross member 2 in the area of the through-bolts, reinforcement elements 9 can be provided, for example as in the present case in the interior of the cross member 2, in order, for example, to guarantee a higher local rigidity of the cross member 2. Likewise, however, external reinforcement elements 9 are also conceivable. The nut 10 is preferably formed as a weld nut and welded onto the flange 7 of the retaining means 4 of the steering column 3, for example by means of spot-welding or projection welding. The through-bolt 6 is tightened by means of the bolt head.

The arrangement according to the invention for securing the steering column to the cross member is advantageous in particular with the modular cockpit structure 1, since the cross member 2 can, by simple variation of the hole cutting, be adjusted to the corresponding mounting of different steering columns, without the need for elaborate welded carrier members or retaining elements. In addition to this, the securing according to the invention of the steering column to the cross member, with a simple structure and by favorable use of material, achieves a reduction in weight with at the same time very good torsional rigidity and therewith very good natural frequency properties.

The invention claimed is:

1. Arrangement for securing a steering column to a cross member of a motor vehicle, the steering column including retaining means, the cross member including, for securing the steering column, at least one clearance hole running transverse to a longitudinal direction of the cross member for at least one securing means, and the retaining means of the steering column being secured by the at least one securing means to the cross member, wherein a sleeve is provided for the at least one securing means, wherein the sleeve is inserted through the at least one clearance hole from an outer face side, wherein a reinforcement is provided in an area of the at least one clearance hole in the cross member, wherein the reinforcement is positioned against an interior surface of the cross member proximate a side thereof which is opposite the outer face side, and wherein a first end of the sleeve axially abuts the reinforcement such that the reinforcement is interposed between the interior surface and the first end of the sleeve.

2. Arrangement for securing a steering column according to claim 1, wherein the at least one securing means comprises at least one bolt.

3. Arrangement for securing a steering column according to claim 2, wherein a weld nut is provided for securing each respective bolt.

4. Arrangement for securing a steering column according to claim 1, wherein at least one of the cross member or the retaining means are at least partially comprised of metal.

5. Arrangement for securing a steering column according to claim 1, wherein the retaining means includes at least one flange having at least one hole for the at least one securing means.

6. Arrangement for securing a steering column according to claim 5, wherein the at least one securing means is a bolt and the sleeve includes an internal thread.

7. Arrangement for securing a steering column according to claim 1, wherein the at least one securing means is a bolt and the sleeve is a bolt sleeve.

8. Arrangement for securing a steering column according to claim 1, wherein at least one weld nut is provided for at least one bolt on an inner side of the cross member.

9. Arrangement for securing a steering column according to claim 1, wherein the sleeve is a continuous bolt sleeve that is provided as reinforcement at a force accommodation point in an area of a respective clearance hole in the cross member.

10. Arrangement for securing a steering column according to claim 1, wherein the sleeve has a second end with a flange formed thereon.

11. Arrangement for securing a steering column according to claim 10, wherein the flange prevents passage of the second end of the sleeve through the at least one clearance hole and into an interior space of the cross member.

12. Arrangement for securing a steering column according to claim 10, wherein the flange abuts the outer face side of the cross member.

13. Arrangement for securing a steering column according to claim 10, wherein the flange is interposed between the outer face side of the cross member and at least one flange of the retaining means.

14. Arrangement for securing a steering column according to claim 1, wherein the first end of the sleeve axially abuts the reinforcement in an interior space of the cross member such that the first end does not extend through and out of the at least one clearance hole.

15. Arrangement for securing a steering column according to claim 14, wherein the sleeve has a second end with a flange formed thereon, the flange abutting the outer face side of the cross member, wherein the flange prevents passage of the second end of the sleeve through the at least one clearance hole and into an interior space of the cross member.

16. Arrangement for securing a steering column according to claim 1, wherein the first end of the sleeve axially abuts the reinforcement in an interior space of the cross member such that the first end does not extend through and out of the at least one clearance hole, and wherein the sleeve includes a second end with a flange formed thereon.

17. Arrangement for securing a steering column according to claim 16, wherein the flange is interposed between the outer face side of the cross member and at least one flange of the retaining means.

* * * * *